United States Patent [19]

Koskinen

[11] 3,783,415

[45] Jan. 1, 1974

[54] TRANSFORMER

[75] Inventor: Sulo Koskinen, Burnaby, British Columbia, Canada

[73] Assignee: The Anaconda Company, New York, N.Y.

[22] Filed: Apr. 19, 1972

[21] Appl. No.: 245,495

[52] U.S. Cl. ........................ 333/25, 333/26, 333/32, 333/33

[51] Int. Cl. ........................... H03h 7/38, H03h 7/42

[58] Field of Search ................... 333/33, 32, 24, 25, 333/26

[56] References Cited

UNITED STATES PATENTS

| | | | |
|---|---|---|---|
| 2,865,006 | 12/1958 | Sabaroff | 333/33 |
| 3,025,480 | 3/1962 | Guanella | 333/33 |
| 3,114,120 | 12/1963 | Heck | 333/25 |
| 3,373,373 | 3/1968 | McClure | 333/33 X |
| 3,413,574 | 11/1968 | Schroeder | 333/11 X |

OTHER PUBLICATIONS

"Reference Data for Radio Engineers" Howard W. Sams & Co., Inc., New York 1968; pp. 22–21 to 22–24.

Wlasuk – "VHF/UHF Balunt in RCA Technical notes, RCA TN No: 704 Jan. 1967; 1 page.

*Primary Examiner*—Herman Karl Saalbach
*Assistant Examiner*—Marvin Nussbaum
*Attorney*—Dean S. Edmonds et al.

[57] ABSTRACT

A transformer is described comprising a body of ferromagetic material and first and second conducting means that are wrapped around or pass through the ferromagnetic body. Each said conducting means comprises a plurality of insulated wires that are twisted together and doped with a high dielectric constant material in the region adjacent the ferromagnetic body. By this arrangement, an impedance transforming device is provided that has excellent broadband characteristics over several octaves in the radio frequency region and also has extremely low output impedance levels. Consequently, this device is suitable for matching the input impedance levels of transistor amplifiers.

11 Claims, 6 Drawing Figures

TRANSFORMER

BACKGROUND OF THE INVENTION

This invention concerns a transformer especially useful as an impedance transforming device.

Numerous impedance transforming devices are known in the art. See, for example, U.S. Pat. No. 3,025,480 on "High Frequency Balancing Units." Such devices, as is known in the prior art, typically provide impedance transformation over relatively broad bands of the radio frequency transformation over relatively broad bands of the radio frequency spectrum. They are thus able to couple electrically balanced circuits or devices to unbalanced loads, and vice versa, without requiring complicated circuitry. By various means, some of which are set forth in U.S. Pat. No. '480, broadband impedance transformation can be achieved to reach impedance levels above approximately 20 ohms.

It is frequently desirable however, to reach impedance levels below 20 ohms because many transistor amplifiers and the like have input impedances on the order of 10 ohms or less. Unfortunately, when attempts are made with prior art devices to reach impedance levels less than 20 ohms while maintaining the broadband characteristics of the transforming device, excessive losses are encountered.

SUMMARY OF THE INVENTION

I have found, however, that such losses may be avoided by making each conductor in the transforming device out of two or more insulated wires that are twisted together and doped with a high dielectric constant material. Thus, the transforming device of my invention comprises a body of ferromagnetic material and first and second conducting means that preferably pass through said ferromagnetic body. Each conducting means comprises a plurality of insulated wires; and where these wires pass through the ferromagnetic body, the wires are twisted around each other and doped with a high dielectric constant material. Outside the ferromagnetic body the wires are separate from each other and there is no dielectric material between them with the possible exception of individual insulation surrounding each wire.

Within the ferromagnetic body the wires are in close contact with each other and there is high magnetic coupling between them. Because they have a common magnetic field, the wires behave like a single wire as far as inductance is concerned. At the same time, because the wires are twisted together and doped with a high dielectric constant material, the wires have a much higher capacitance. As a result, the impedance transforming device has a low line impedance and maximum electrical length for a given length of wire. Outside the ferromagnetic body, the individual wires of each conducting means are separated and individually connected to a load. Because each wire is seaparate, it has a separate magnetic field; and all the wires behave like several wires in parallel. As a result, the inductance of all the wires is the inductance of one wire divided by the number of wires in parallel.

BRIEF DESCRIPTION OF THE DRAWING

These and other objects, features, and elements of my invention will be more readily apparent from the following detailed description of the drawing in which.

DETAILED DESCRIPTION OF THE DRAWING

Figures 1, 2:
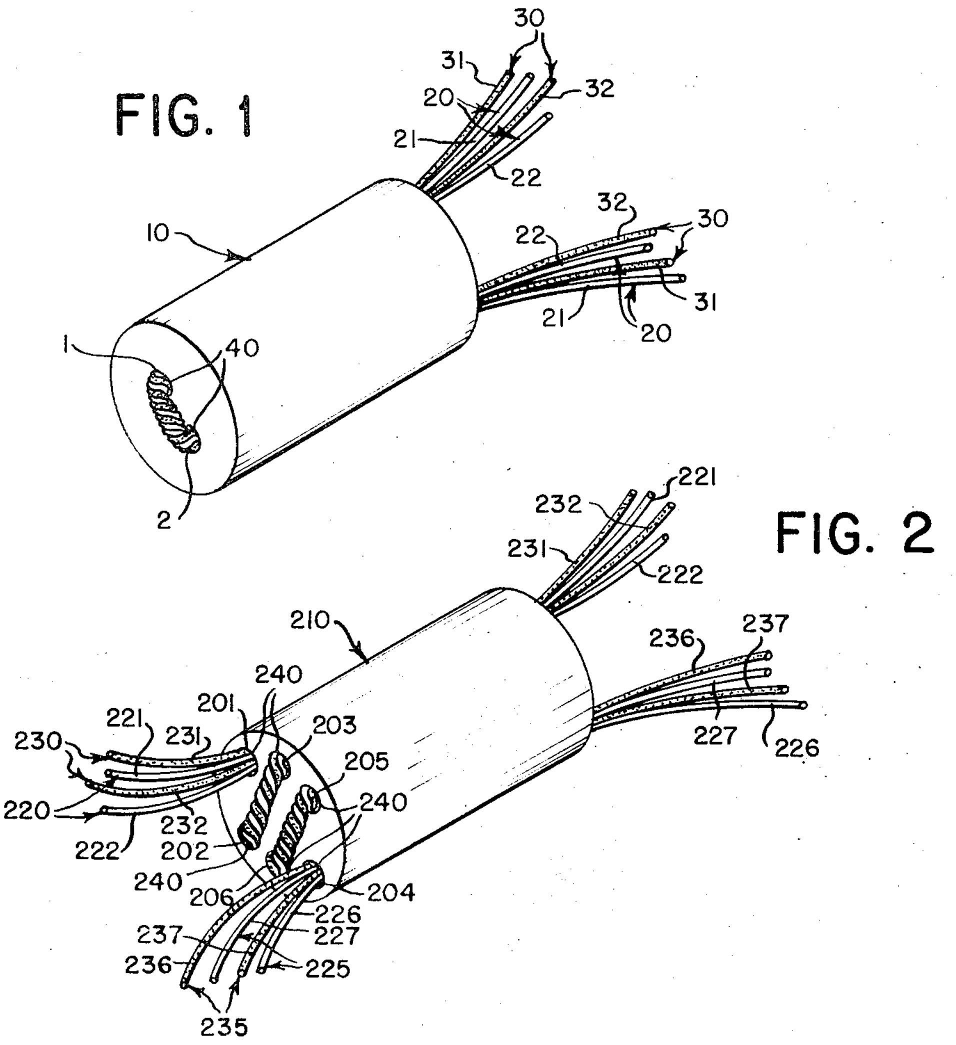
FIG. 1 is an illustration of a first illustrative embodiment of my invention.
FIG. 2 is an illustration of a second illustrative embodiment of my invention.

Illustrative apparatus used in practicing my invention is shown in FIG. 1. This apparatus comprises a core 10 of ferromagnetic material in which there are two holes 1, 2. Through these holes are threaded two sets 20, 30 of electrically conducting insulated wires. Illustratively, set 20 comprises a pair 21, 22 of insulated wires and set 30 similarly comprises a pair 31, 32 of insulated wires. Within ferromagnetic core 10 and in the region where the wires pass from hole 1 to hole 2, wires 21, 22, 31, 32 are twisted together. In addition, they are doped by a high dielectric constant material 40 that fills the remaining space in holes 1, 2.

A second illustrative embodiment of my invention is shown in FIG. 2. This apparatus comprises a core 210 of ferromagnetic material in which there are six holes 201, 202, 203, 204, 205, 206. Through these holes are threaded four sets 220 225, 230, 235 of electrically conducting insulated wires. Illustratively, set 220 comprises a pair 221, 222 of insulated wires; set 225 comprises a pair 226, 227 of insulated wires; set 230 comprises a pair 231, 232 of insulated wires; and set 235 comprises a pair 236, 237 of insulated wires. Sets 220, 230 of wires are threaded through hole 201 to the far side of core 210, back through hole 202 and then through hole 203. Sets 225, 235 of wires are threaded through hole 204, back through hole 205 and then through hole 206. Within ferromagnetic core 210 and in the region where the wires pass from one hole to the next, the wires are twisted together. In addition, they are doped by a high dielectric constant material 240 that fills the remaining space in holes 201, 202, 203, 204, 205, 206.

The foregoing embodiments of my invention may be used in numerous applications. The embodiment shown in FIG. 1 may be used as a low loss coupling device. The embodiment shown in FIG. 2 provides for impedance transformation and has numerous applications in matching low input impedance loads. Alternatively, pairs of the embodiment shown in FIG. 1 may be used in circuits similar to those in which the embodiment of FIG. 2 is used.

Figure 3:
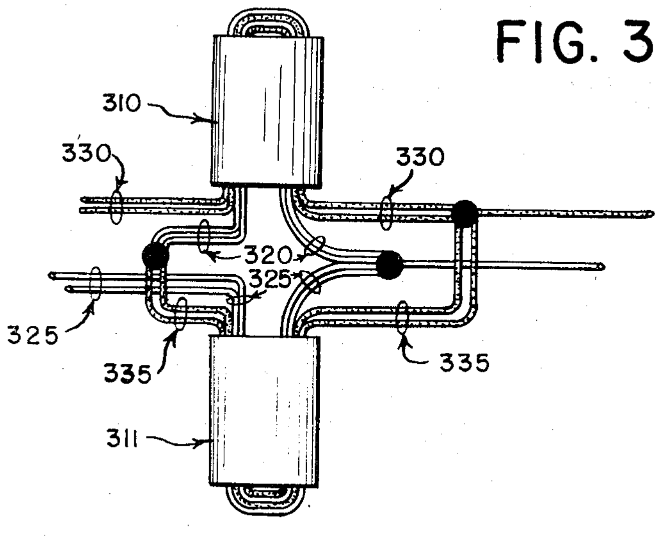
FIGS. 3, 4, 5, and 6 are schematic representations of applications to which the first and second embodiments of my invention may be put.

One application of my invention is shown in FIG. 3 where an impedance is transformed to one fourth its input level. The apparatus shown in FIG. 3 comprises first and second ferromagnetic cores 310, 311 and sets 320, 325, 330, 335 of wires. Ferromagnetic cores 310, 311 may be separate cores each of which is similar to core 10 of FIG. 1; or they may be joined together as the two halves of a single core similar to core 210 of FIG. 2. Sets 320, 330 of wires are threaded through holes in ferromagnetic core 310 and at least within these holes are twisted together. Similarly, sets 325, 335 of wires are threaded through holes in ferromagnetic core 311 and at least within these holes are twisted together. For clarity in FIG. 3 (and in FIG. 4 below), the wires that pass from one hole to another are depicted as parallel to each other. However, it will be understood that these wires may be twisted. At the input end of cores 310,

311, sets 320, 335 are connected together. At the output end, sets 320, 325 are connected together and sets 330, 335 are also connected together. For this connection, as is shown in FIG. 19 of U.S. Pat. No. '480, an impedance transformation ratio of 4:1 is obtained. However, by using sets of wires rather than single conductors in accordance with my invention, it is possible to achieve such transformation ratios with broadband characteristics at much lower impedances than before. For example, the input impedance to the apparatus of FIG. 3 might be 75 ohms with the result that the output impedance is only 18.75 ohms.

Figure 4:
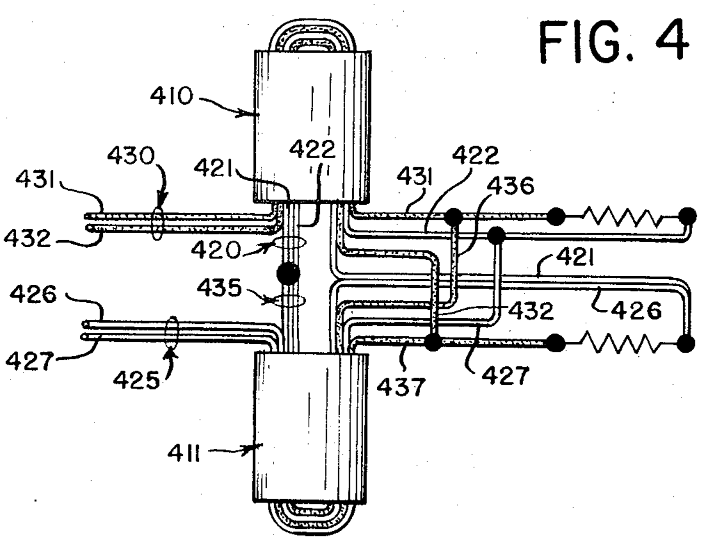

It is not necessary that the output lines be connected in parallel as in FIG. 3. Thus, they may be used to feed independent loads as shown in FIG. 4. This apparatus is similar to that of FIG. 3 and comprises first and second ferromagnetic cores 410, 411 and four sets 420, 425, 430, 435 of wires. Again, sets 420, 430 of wires are threaded through holes in ferromagnetic core 410 and at least within these holes are twisted together Similarly, sets 425, 435 of wires are threaded through holes in ferromagnetic core 411 and at least within these holes are twisted together. At the input end of cores 410, 411, sets 420, 435 of wires are connected together. At the output end, individual wires of the various sets are connected together. Specifically, set 420 illustratively comprises two wires 421, 422, and set 425 of wires comprises two wires 426, 427. As shown in FIG. 4, wires 421, 426 are connected together and wires 422, 427 are connected together. Set 420 illustratively comprises two wires 431, 432, and set 435 comprises two wires 436, 437. Wires 431, 436 are connected together, and wires 432, 437 are connected together. For this connection arrangement, the impedance transformation ratio of the device is 2:1.

Figure 5:
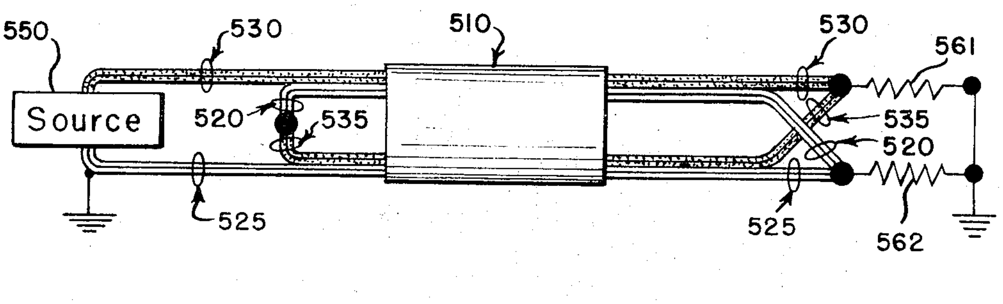
Figure 6:
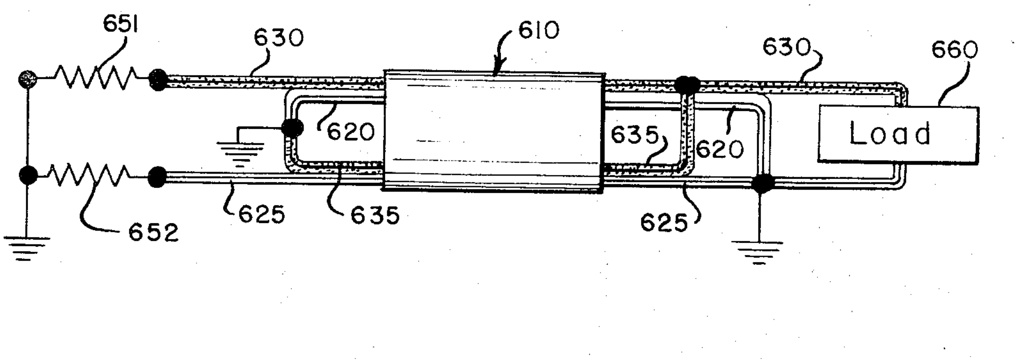

Particular applications of the apparatus shown in FIG. 2 are depicted in FIGS. 5 and 6. FIG. 5 illustrates the use of the apparatus similar to that of FIG. 2 to match a line source 550 to two loads 561, 562 in the input of a push-pull transistor amplifier. The remaining elements of FIG. 5 are a core 510 of ferromagnetic material that is the equivalent of core 210 of FIG. 2 and set 520, 525, 530, 535 of wires. As indicated in FIG. 3, this circuit provides an impedance transformation ratio of 4:1. Consequently, it may be used with a 75 ohm input load 550 to feed two 9 ohm loads 561, 562.

FIG. 6 illustrates the use of similar apparatus to match equivalent source impedances 651, 652 of a transistor amplifier output to a load 660. The remaining elements of FIG. 6 are similar to the elements of FIG. 5 and have the same numbers as the corresponding elements of FIG. 5 incremented by 100. Note, however, that wires 620, 635 are grounded. As indicated, wires 620, 625, 630, 635 are sets of wires; and it will be understood that each of them is twisted within core 610 and not twisted elsewhere. Again, the impedance transformation ratio of this transformer is 4:1. As a result, this circuit may be used to match two 150 ohm resistances 651, 652 to a 75 ohm load 660.

In practicing my invention, I have used a ferromagnetic core containing six holes like that illustrated in FIG. 2. The core was cylindrical in shape with a diameter of one-fourth inch and a length of one-half inch. The holes were just large enough to permit the twisted wires to be threaded through them. I began by deburring all six holes in each end of the core so that there would be no sharp corners of the core to scratch insulation off the wires. I then twisted together one pair of No. 32 wires so that there were approximately six twists per inch, and I did the same for a second pair of No. 32 wires. Next, the two pairs of twisted wires were twisted together to form a smooth natural twist. The four-wire twist was then cut to form two sections of equal length and both were filled with Dow Corning Compound No. 5, which is silicon jelly. One section of four-wire twist was wound through three of the holes in the core as described in conjunction with FIG. 2; and the other section was wound through the other three holes in the core.

The wires of each four-wire twist extending from the core were then untwisted and separated from each other up to the point where they enter the core. Any remaining space in the holes through the core was then filled with Dow Corning Compound No. 5.

If desired, the capacitance of the wires in the core can be further increased by using greater number of twists per inch and a dopant with a higher dielectric constant. For example, ethylene glycol or glycerine could be used instead of Dow Corning Compound No. 5.

As will be obvious to those skilled in the art, my invention permits many variations in its practice. Instead of using only pairs of wires to form the various sets of electrically conducting wires detailed above, three or more wires may be twisted togehter to form each set. This permits further reductions in the inductance of the wires between the ferromagnetic body and the load. Variations may also be made in the way the wires are twisted together. For example, instead of forming pairs of twisted wires and then twisting these pairs together, four wires can be twisted together.

Numerous schemes will be apparent to those skilled in the art for threading the wires through the ferromagnetic body or wrapping them around it. Suffice to say that my invention will operate wherever the wires are magnetically coupled and are close enough to the ferromagnetic body that a substnatial portion of a magnetic field established by a current in said wires interacts with the ferromagnetic body. Of course, where the wires pass through the ferromagnetic body, nearly all the magnetic field established by currents in the wires interacts with the ferromagnetic body; and, where the wires are wrapped around the ferromagnetic body, upward of one half the magnetic field established by a current in the wires interacts with the ferromagnetic body. Preferably, the wires pass through the ferromagnetic body in holes that are just big enough to permit their passage because this construction produces the best broadband characteristics.

The frequency range over which my invention will achieve broadband characteristics will vary with the construction details of the transformer and the application to which the transformer is put. For the particular application shown in FIG. 6 and the construction details described above, a matching network is obtained that operates over the frequency range of 5 MegaHertz to 300 MegaHertz. Larger ferromagnetic cores are used for lower frequencies and smaller cores are used for higher frequencies. In general, my invention will readily provide operation over several octaves of frequency.

As will be obvious to those skilled in the art, numerous other modifications may be made to the preferred embodiment and applications described and illustrated herein without departing from the invention as defined in the claims.

What is claimed is:

1. A broadband impedance matching device comprising:
a body of ferromagnetic material;
first and second means for conducting electric currents through a region adjacent said ferromagnetic body in which they are magnetically coupled, said region being close enough to said ferromagnetic body that a substantial portion of a magentic field established by a current in the first or second conducting means interacts with said ferromagnetic body;
said first conducting means having an input and an output and comprising therebetween a first plurality of insulated wires that are twisted together and doped with a high dielectric constant material in the region adjacent the ferromagnetic body and are not so twisted and doped outside said region; and
said second conducting means having an input and an output and comprising therebetween a second plurality of insulated wires that are twisted together and doped with a high dielectric constant material in the region adjacent the ferromagnetic body and are not so twisted and doped outside said region.

2. The apparatus of claim 1 wherein the first and second conducting means are wrapped around the ferromagnetic body to form the region where a substantial portion of the magnetic field interacts with the ferromagnetic body.

3. The apparatus of claim 1 wherein the first and second conducting means pass through the ferromagnetic body to form the region where a substantial portion of the magnetic field interacts with the ferromagnetic body.

4. The apparatus of claim 1 further comprising:
third and fourth means for conducting electric currents through a region adjacent said ferromagnetic body in which they are magnetically coupled, said region being close enough to said ferromagnetic body that a substantial portion of a magnetic field established by a current in the third or fourth conducting means interacts with said ferromagnetic body;
said third conducting means having an input and an output and comprising therebetween a third plurality of inculated wires that are twisted together and doped with a high dielectric constant material in the region adjacent the ferromagnetic body and are not so twisted and doped outside said region; and
said fourth conducting means having an input and an output and comprising therebetween a fourth plurality of insulated wires that are twisted together and doped with a high dielectric constant material in the region adjacent the ferromagnetic body and are not so twisted and doped outside said region.

5. The apparatus of claim 4 wherein:
the first and second conducting means are twisted together and are wrapped around the ferromagnetic body to form the region where a substantial portion of the magnetic field established by a current in the first or second conducting means interacts with the ferromagnetic body; and
the third and fourth conducting means are twisted together and are wrapped around the ferromagnetic body to form the region where a substantial portion of the magnetic field established by a current in the third or fourth conducting means interacts with the ferromagnetic body.

6. The apparatus of claim 4 wherein:
the first and second conducting means are twisted together and pass through the ferromagnetic body to form the region where a substantial portion of the magnetic field established by a current in the first or second conducting means interacts with the ferromagnetic body; and
the third and fourth conducting means are twisted together and pass through the ferromagnetic body to form the region where a substantial portion of the magnetic field established by a current in the third or fourth conducting means interacts with the ferromagnetic body.

7. The apparatus of claim 6 wherein:
the first, second, third, and fourth conducting means are pairs of No. 32 wires;
in the regions where they are twisted, the wires in each pair are twisted together about six times per inch; and
the high dielectric constant material is silicon jelly.

8. The broadband impedance matching device of claim 1 wherein the input of at least one of the first and second conducting means is not located adjacent the ferromagnetic body and the insulated wires in said conducting means are not twisted and doped between said input and the region adjacent the ferromagnetic body.

9. The broadband impedance matching device of claim 1 wherein the output of at least one of the first and second conducting means is not located adjacent the ferromagnetic body and the insulated wires in said conducting means are not twisted and doped between said output and the region adjacent the ferromagnetic body.

10. The broadband impedance matching device of claim 4 wherein the input of at least one of the third and fourth conducting means is not located adjacent the ferromagnetic body and the insulated wires in said conducting means are not twisted and doped between said input and the region adjacent the ferromagnetic body.

11. The broadband impedance matching device of claim 4 wherein the output of at least one of the third and fourth conducting means is not located adjacent the ferromagnetic body and the insulated wires in said conducting means are not twisted and doped between said output and the region adjacent the ferromagnetic body.

* * * * *

UNITED STATES PATENT OFFICE
CERTIFICATE OF CORRECTION

Patent No. 3,783,415 Dated January 1, 1974

Inventor(s) Sulo Koskinen

It is certified that error appears in the above-identified patent and that said Letters Patent are hereby corrected as shown below:

Column 1, lines 10 and 11, the phrase "over relatively broad bands of the radio frequency transformation" is repetitious and should be omitted.

Column 3, line 30, "Set 420" should read --Set 430--

Column 5, line 48, "plurality of inculated" should read --plurality of insulated--

Signed and sealed this 7th day of May 1974.

(SEAL)
Attest:

EDWARD M.FLETCHER,JR.
Attesting Officer

C. MARSHALL DANN
Commissioner of Patents